(12) United States Patent
Nusser (10) Patent No.: US 8,646,542 B2
(45) Date of Patent: Feb. 11, 2014

(54) GROUND PREPARATION APPLIANCE HAVING A DRIVEN WORKING SHAFT ARRANGEMENT

(75) Inventor: Hans-Martin Nusser, Neu-Ulm (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 373 days.

(21) Appl. No.: 12/928,619

(22) Filed: Dec. 15, 2010

(65) Prior Publication Data

US 2011/0147019 A1 Jun. 23, 2011

(30) Foreign Application Priority Data

Dec. 18, 2009 (DE) .......................... 10 2009 060 481

(51) Int. Cl.
*A01B 33/12* (2006.01)
(52) U.S. Cl.
USPC ............................ 172/112; 172/315; 172/510
(58) Field of Classification Search
USPC ......................................... 172/112, 508, 510
See application file for complete search history.

(56) References Cited

U.S. PATENT DOCUMENTS

| 1,435,766 | A |   | 11/1922 | Varland |
|---|---|---|---|---|
| 2,805,611 | A | * | 9/1957 | Fletchall ........................ 172/41 |
| 3,011,793 | A | * | 12/1961 | McElhinney et al. ......... 239/651 |
| 3,768,572 | A | * | 10/1973 | McCanse et al. ............. 172/112 |
| 4,204,714 | A | * | 5/1980 | Jacobson et al. ............... 299/1.5 |
| 4,267,891 | A | * | 5/1981 | van der Lely et al. ......... 172/28 |
| 5,373,902 | A | * | 12/1994 | Lindblom ..................... 172/112 |
| 7,891,480 | B2 | * | 2/2011 | Lemaistre et al. ......... 198/466.1 |

FOREIGN PATENT DOCUMENTS

| DE | 20 2004 006 301 U | 8/2004 |
|---|---|---|
| EP | 0 143 003 A2 | 5/1985 |
| JP | 01171401 A | 7/1989 |
| JP | 09201103 A | 8/1997 |
| JP | 2003-180107 | 7/2003 |

OTHER PUBLICATIONS

Office Action of German Patent Ottice dated Jul. 30, 2010 issued in DE 10 2009 060 481 (3 pages).
Search Report of European Patent Office issued in European Application No. 10195458.4 with English translation of category of cited documents dated Jun. 4, 2013 (10 pages).

* cited by examiner

*Primary Examiner* — Thomas B Will
*Assistant Examiner* — Joel F. Mitchell
(74) *Attorney, Agent, or Firm* — Flynn, Thiel, Boutell & Tanis, P.C.

(57) ABSTRACT

Ground preparation appliance having a driven working shaft arrangement.
Working shaft arrangement.
A ground preparation appliance having a driven working shaft arrangement, which is rotatably mounted in a preparation housing that is open towards the ground, is known.
According to the invention, the preparation housing has at least two housing envelope portions, which are mounted so as to be displaceable relative to one another in the circumferential direction.
Application for rear tillers on trail caterpillars for the purpose of snow surface preparation.

12 Claims, 7 Drawing Sheets

GROUND PREPARATION APPLIANCE HAVING A DRIVEN WORKING SHAFT ARRANGEMENT

FIELD OF THE INVENTION

The invention relates to a ground preparation appliance having a driven working shaft arrangement, which is rotatably mounted in a preparation housing that is open towards the ground.

Such ground preparation appliances can be used in the agricultural domain, or also in the case of snow-trail creation and grooming.

BACKGROUND OF THE INVENTION

Such a ground preparation appliance in the form of a rear tiller for a tracked vehicle for snow-trail preparation is generally known. The rear tiller is mounted onto the rear of a corresponding trail caterpillar by means of a mounting frame. The rear tiller is driven by one or more hydraulic motors, which are powered and controlled via trail-caterpillar hydraulics on the vehicle. The rear tiller has a tiller housing, in which a plurality of tilling shafts are disposed adjacently to one another in alignment and rotatably mounted. The tiller housing covers the tilling shafts in the manner of a hood, and is open downwards. Adjoining the tiller housing rearwards in the normal direction of travel is a smoothing means, also termed a finisher, which comprises a flexible smoothing structure. When the rear tiller is in tilling mode, the tilling shafts take up lumps of snow and ice and fragmentize these lumps in the rotation between the blades of the tilling shaft and an inner wall of the tiller housing. The inner wall of the tiller housing serves as an impact wall, on which the lumps of snow and ice impact and are flung back, in order subsequently to be flung against the inner wall again by the blades of the tilling shaft. This results in the desired fragmentizing of the lumps of snow and ice. Behind the tilling shaft, the prepared residues of snow and ice fall back onto the trail surface, and are compressed and smoothed by the smoothing structure. This results in the creation of the prepared trail surface.

SUMMARY OF THE INVENTION

The object of the invention is to create a ground preparation appliance, of the type mentioned at the outset, which allows variable ground preparation.

This object is achieved in that the preparation housing has at least two housing envelope portions, which are mounted so as to be movable in a fan-like manner—relative to a rotational axis of the working shaft arrangement—relative to one another in the circumferential direction. Owing to the solution according to the invention, a usable impact wall of the preparation housing is variable between a first end position, in which the preparation housing surrounds the working shaft arrangement over a first circumferential angle, and a second end position, in which the at least one first housing envelope portion and the at least one second housing envelope portion complement one another in the circumferential direction and thus surround the working shaft arrangement over a greater circumferential angle. The housing envelope portions are preferably steplessly adjustable relative to one another. The working shaft arrangement can be constructed from a single working shaft or from a plurality of working shafts disposed in alignment next to one another. The individual working shafts can be driven jointly or separately. The preparation housing can be divided, over a preparation width of the ground preparation appliance, into a plurality of housing portions, to each of which a single working shaft is preferably assigned, and which each have at least one displaceable housing envelope portion and one stationary housing envelope portion. It is also possible for more than two housing envelope portions to be provided so as to be displaceable relative to one another in the circumferential direction. The solution according to the invention can be applied in a particularly advantageous manner in the case of a ground preparation appliance in the form of a rear tiller for a trail caterpillar, as has already been described at the outset in respect of its basic function. Owing to the variability of the housing envelope of the tiller housing according to the invention, it is possible to set the housing envelope so as to be larger or smaller, depending on the nature of the snow surface to be prepared. In the case of hard and icy lumps of snow and ice, in particular, an impact wall fanned out over a greater circumferential portion is advantageous. In the case of rather powdery snow conditions, a housing envelope over a lesser circumferential angle is sufficient. Depending on the intended application, therefore, the housing envelope portions can be fanned out in the circumferential direction or slid over one another.

The solution according to the invention is equally suitable for ground preparation appliances in agriculture, in particular for arable preparation.

In a development of the invention, at least one stationary housing envelope portion and at least one movable housing portion are provided, the movable housing portion being mounted so as to be displaceable relative to the stationary housing envelope portion relative to the rotational axis of the working shaft arrangement as viewed in the circumferential direction—in such a way that, in one end position, the housing envelope portions overlap one another in the circumferential direction and, in the other end position, the at least one housing envelope portion extends the at least one stationary housing envelope portion in a substantially aligned manner.

In a further development of the invention, the preparation housing is adjoined on the back side—relative to a preparation direction—by a smoothing means for compressing the prepared ground, which smoothing means has a flexible smoothing structure that is attached to the movable housing envelope portion or to the stationary housing envelope portion. In the case of a ground preparation appliance in the form of a rear tiller, the stationary housing envelope portion remains fixed relative to a mounting frame of the trail caterpillar, insofar as it is drawn by the trail caterpillar. The displaceable housing envelope portion is disposed so as to be movable relative to the stationary housing envelope portion. In principle, however, the stationary housing envelope portion can be adjusted, jointly with the entire tiller housing, into various positions relative to the trail caterpillar, as is known in principle for rear tillers of trail caterpillars. The ground prepared by the working shaft arrangement and the preparation housing is compressed and smoothed by the smoothing means. This development can be applied particularly advantageously in the case of a rear tiller for a trail caterpillar, since the smoothing means forms the trail pattern of the snow-trail surface being prepared. The lumps of snow and ice previously greatly fragmentized by the rear tiller are compressed and smoothed to form a snow trail that is highly practicable by skiers or snowboarders.

In a further development of the invention, drive means are provided for the purpose of adjusting the at least one movable housing envelope portion into differing positions and securing it in the respectively set positions. Preferably, the drive means comprise at least one hydraulic cylinder, which acts on the displaceable housing envelope portion.

In a further development of the invention, the movable housing envelope portion has a wall that is arcuate in cross-section and that overlaps the stationary housing envelope portion on the inside in the circumferential direction, at least to a large extent. As a result, a double wall is formed, into which the arcuate wall of the displaceable housing envelope portion fits closely, on the inside, against an inner wall of the stationary housing envelope portion. The arcuate wall of the displaceable housing envelope portion and the inner wall of the stationary housing envelope portion define—depending on the displacement position—the impact wall for ground particles that are flung against the inside of the preparation housing by the working shaft arrangement.

In a further development of the invention, the arcuate wall is in the form of an impact-resistant, in particular noise-damping and at least largely dimensionally stable surface structure, in particular made of plastic. The surface structure can be single-layered or multi-layered. Preferably, a surface of the surface structure that is directed towards the working shaft arrangement is smooth-faced, in order to prevent, at least to a large extent, adhering of ground particles or dirt particles.

In a further development of the invention, the wall is held at a carrier profile, from which the wall projects away freely, and which is displaceably guided on the outside of the at least one stationary housing envelope portion by means of guide arrangements. The carrier profile preferably extends over the working width of the working housing, or over a working width of a corresponding housing portion.

In a further development of the invention, the carrier profile is disposed adjacently to a longitudinal lateral edge of the stationary housing envelope portion. The longitudinal lateral edge preferably constitutes a back-side boundary—as viewed in the normal direction of preparation—which extends over the working width of the working housing.

In a further development of the invention, the guide arrangements have arcuate guide runners, which are displaceably guided in guide profilings on the outer circumference of the at least one stationary housing envelope portion. This allows reliable guidance and mounting of the displaceable housing envelope portion.

In a further development of the invention, the guide runners have sliding surface portions having a reduced coefficient of sliding friction. As a result, a particularly smooth-running adjustment of the displaceable housing envelope portion relative to the stationary housing envelope portion can be achieved.

In a further development of the invention, arcuate guide webs, which guide opposing lateral edges of the arcuate wall, are provided at opposing outside-face housing closures of the preparation housing. This development ensures that the wall of the displaceable housing envelope portion is also reliably guided at its opposing outside faces, in order to ensure displaceability that fits closely to the inner wall of the stationary housing envelope portion. The guiding of the arcuate wall via the outside-face guide webs reduces the risk of ground particles, in particular lumps of snow or ice, being forced between the arcuate wall and the inner wall of the stationary housing envelope portion.

In a further development of the invention, a surface region of the wall that is at a distance from the carrier profile is connected to the guide runners via securing means, the securing means projecting through longitudinal slots in the stationary housing envelope portion. In its freely projecting surface region—preferably distributed over the working width of the preparation housing—the inside, arcuate wall is therefore connected to the guide runners extending on the outside, in that corresponding securing means project through longitudinal slots in the stationary housing envelope portion. These longitudinal slots also necessarily define the maximum adjustment angle of the wall. The longitudinal slots extend in the circumferential direction and are disposed parallelwise in relation to one another, distributed over the width of the stationary housing envelope portion. The number of longitudinal slots preferably corresponds to the number of guide runners that hold the carrier profile, and thereby the wall.

BRIEF DESCRIPTION OF THE DRAWINGS

Further advantages and features of the invention are given by the claims and by the following description of preferred exemplary embodiments of the invention, which are represented by the drawings.

DETAILED DESCRIPTION

A rear tiller 1, 1a according to FIGS. 1 to 12, serving as a ground preparation appliance, is provided as a rear mount-on appliance on a trail caterpillar, which is provided, in a manner known in principle, for snow-trail creation and grooming. The rear tiller 1, 1a can be detachably fastened to a rear carrier arrangement of the trail caterpillar. All hydraulic drive means of the rear tiller 1, 1a are powered through vehicle hydraulics of the trail caterpillar and controlled from the vehicle. The rear tiller 1, 1a serves to break up, fragmentize and smooth the snow-trail surface that has been churned up and lumped by a left and a right track running gear of the trail caterpillar. For this purpose, the rear tiller has a smoothing means 5, 10; 5, 10a, which—as viewed in the normal direction of preparation and travel of the trail caterpillar—adjoins the rear of a tiller housing 2, 2a of the rear tiller 1, 1a. In the case of the embodiments represented, the rear tiller 1, 1a has a tiller housing constituted by two housing portions, each of which extends over one half of the working width of the rear tiller 1, 1a. In each housing portion, a respective tilling shaft 3, 3a is rotatably mounted and driven by hydraulic motor means. The tilling shaft 3, 3a extends substantially over a working width of the associated housing portion. When in the operating state, the two adjacently disposed housing portions of the tiller housing 2, 2a are rigidly coupled to one another. Preferably, a corresponding hydraulic drive is provided between the two housing portions, in order to drive the two tilling shafts 3, 3a that extend out from the center to opposing sides.

Figure 1:
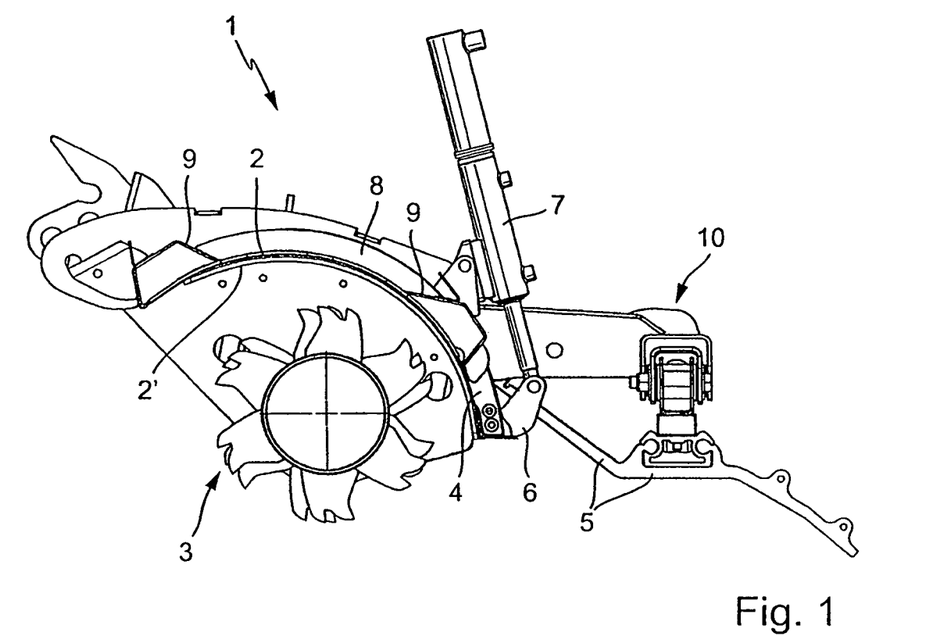
FIG. 1 shows a sectional side view of a first embodiment of a ground preparation appliance according to the invention, in the form of a rear tiller for a track caterpillar.
Figure 2:
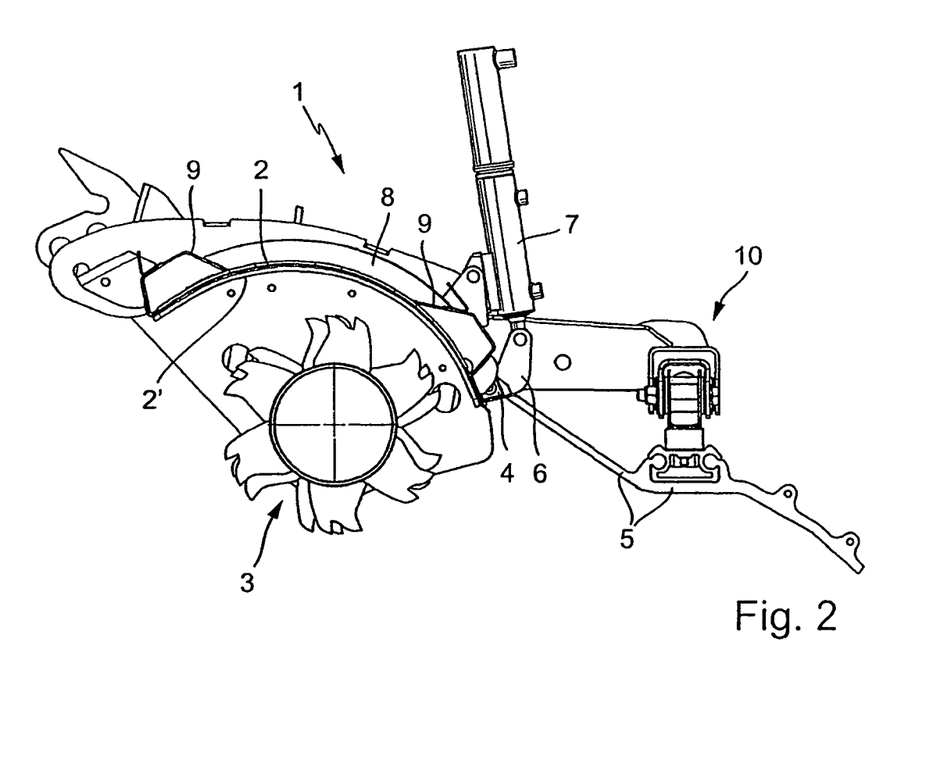
FIG. 2 shows the rear tiller according to FIG. 1 with an adjusted housing envelope.
Figure 3:
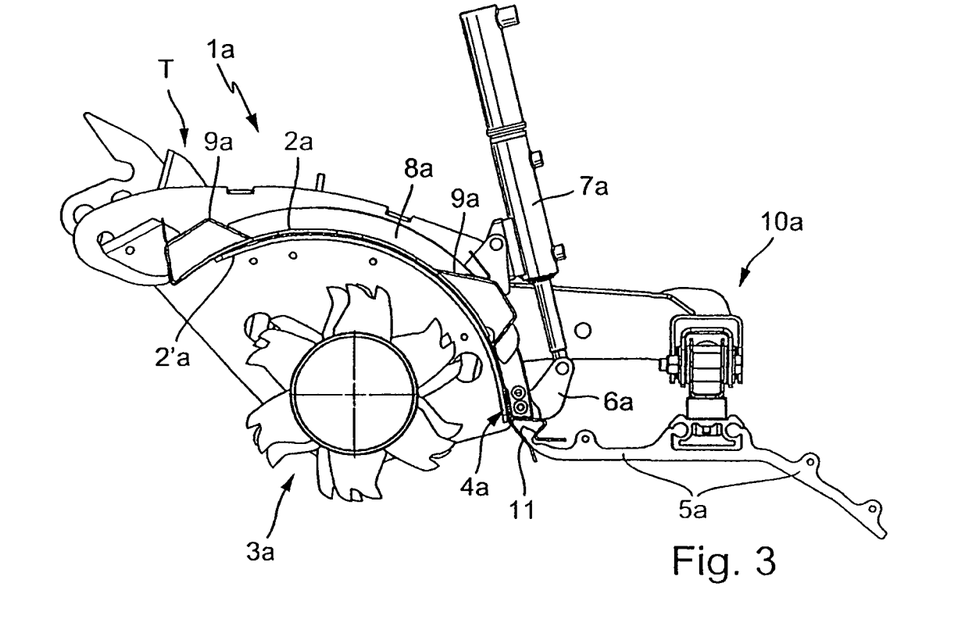
FIG. 3 shows a further embodiment of a rear tiller according to the invention, similar to that of FIG. 1, in which a finisher is connected in an articulated manner to an adjustable housing envelope portion.
Figure 4:
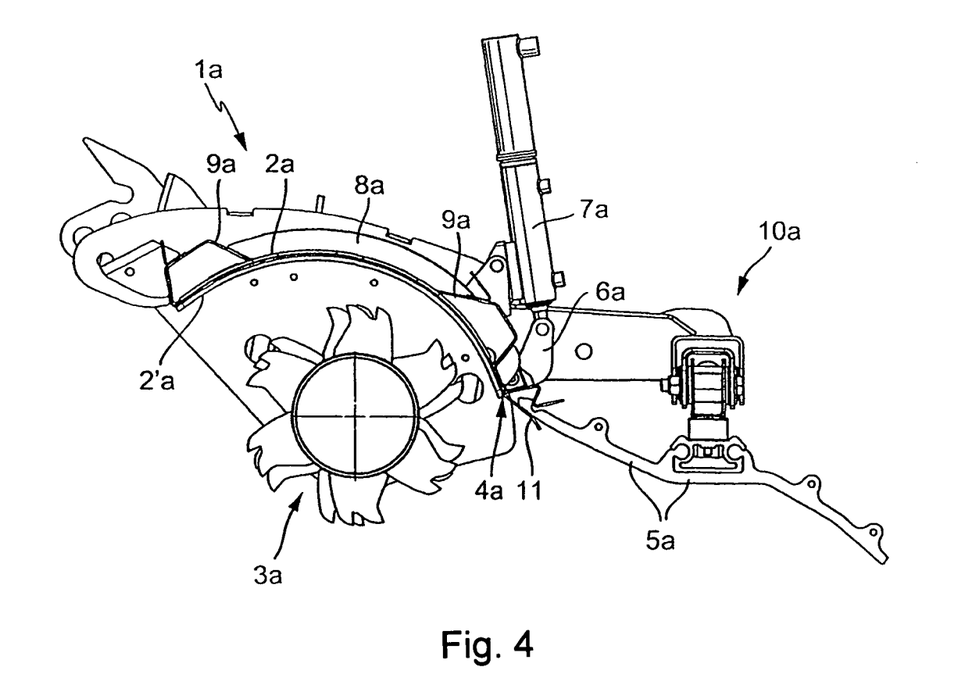
FIG. 4 shows the rear tiller according to FIG. 3 with an adjusted housing envelope.

In the case of the two embodiments according to FIGS. 1 and 2, and according to FIGS. 3 to 12, the smoothing means has a flexible smoothing structure in the form of a finisher arrangement 5, 5a, to which pressure can be applied from above via a plurality of carrier arrangements 10, 10a connected to a frame of the tiller housing 2, 2a. Preferably, a rear finisher of the finisher arrangement 5, 5a extends over an entire working width of the tiller housing 2, 2a, and therefore also, as a single piece and continuously, beyond the housing portions of the tiller housing that are coupled to one another. The finisher arrangement additionally has lateral finishers, not designated in greater detail, of which a left lateral finisher can be seen in FIG. 5. The only difference between the two embodiments as represented by FIGS. 1 and 2 and by FIGS. 3 and 4 is that, in the case of the embodiment according to FIGS. 1 and 2, the rear finisher acts on a stationary housing envelope portion 2 of the tiller housing. In the case of the embodiment according to FIGS. 3 and 4, on the other hand, the rear finisher of the finisher arrangement 5a adjoins a displaceable housing envelope portion 2'a of the housing portion of the tiller housing. For this purpose, the displaceable housing envelope portion 2'a has a carrier profile 4a, 11, in the shape of a swallow-tail, in which a front outside-face end of the rear finisher is held positively.

In other respects, the two rear tillers according to the two embodiments according to FIGS. 1 and 2 and according to FIGS. 3 and 4 are identical to one another in form. In the following, the embodiment according to FIGS. 3 and 4 is to be explained in detail with reference to FIGS. 5 to 12. Insofar as the corresponding explanations do not relate to the connection of the rear finisher to the tiller housing, all statements relating to the rear tiller according to FIGS. 3 to 12 also apply in the same manner to the embodiment according to FIGS. 1 and 2. Identical references have been selected for both embodiments. In the case of the embodiment according to FIGS. 3 and 4, some of these references also have the suffix letter a.

The two housing portions of the tiller housing, which are disposed next to one another over the working width of the tiller housing, are identical to one another in form. In the following, therefore, only one of the two housing portions is described with reference to FIGS. 5 to 12. The same applies to the other housing portion that is not represented. The housing portion according to FIGS. 3 to 6 has a stationary housing envelope portion 2a, which is fixedly connected to a tiller frame T of the rear tiller. At its opposing outside faces, the housing envelope portion 2a has outside-face housing closures, of which one is denoted by S in FIG. 9. The outside-face housing closures S serve to mount the tilling shaft 3a. The outside-face housing closures S are fixedly connected to the stationary housing envelope portion 2a. In cross-section, the stationary housing envelope portion 2a has an arcuate type curvature. The arcuate type curvature extends in the circumferential direction of the housing portion—relative to a housing longitudinal axis, which extends in the transverse direction of the vehicle and which is aligned parallelwise in relation to a rotational axis of the tilling shaft 3a. As can be seen from FIGS. 3 and 4, a central axis of the arcuate curvature of the housing envelope portion 2a is not identical to the rotational axis of the tilling shaft 3a. As a result, an impact space defined between the tilling shaft 3a and an inner wall of the housing envelope portion 2a becomes gradually tapered in the clockwise direction according to FIGS. 3 and 4. As a result, in the case of a tilling shaft 3a rotating likewise in the clockwise direction, large lumps of snow and ice are more easily drawn into the tiller housing. In the circumferential direction, the arcuate, stationary housing envelope portion 2a extends over an angle of more than 90° and preferably less than 130°.

Figure 6:
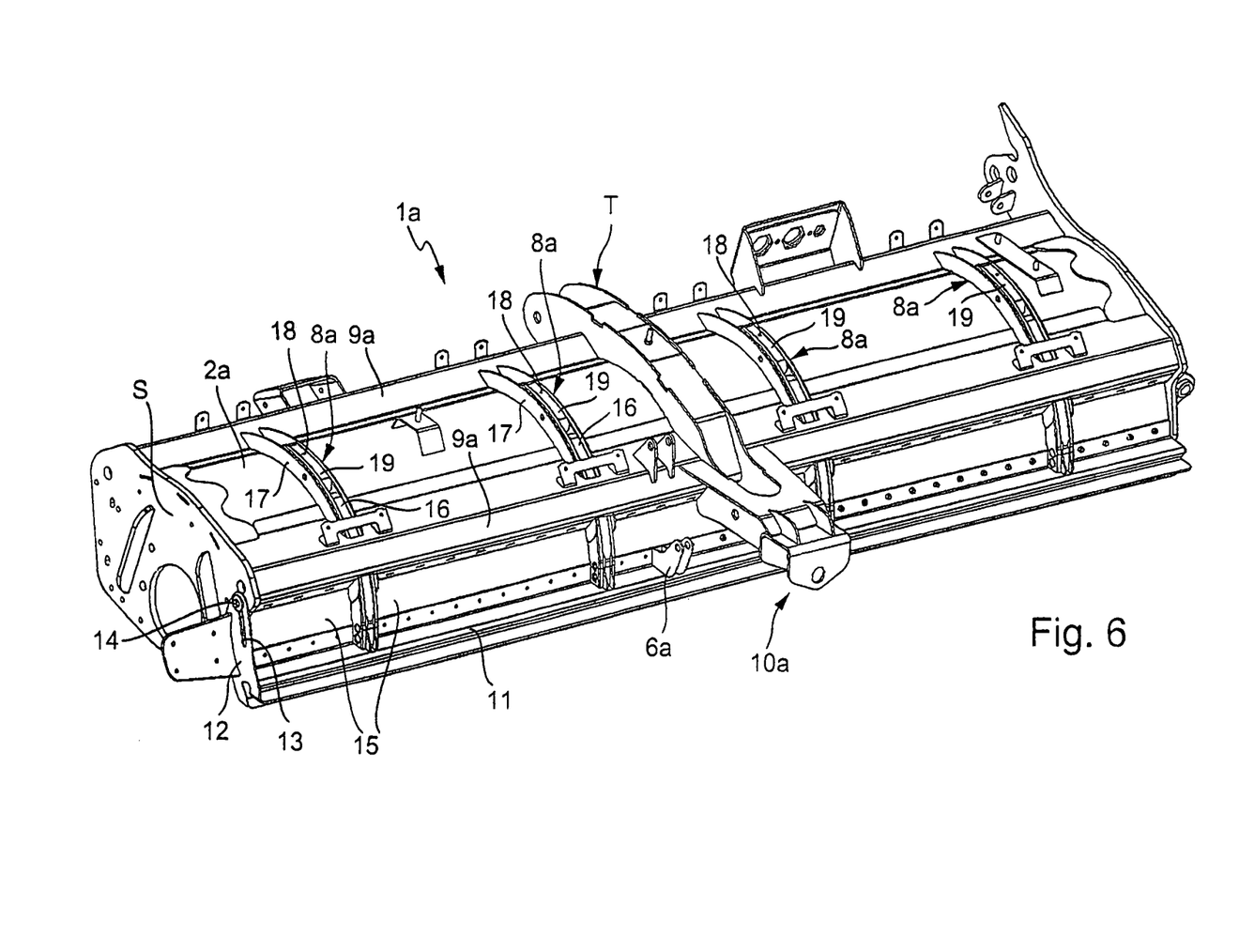
FIG. 6 shows a further perspective representation of a part of the rear tiller according to FIGS. 3 to 5.
Figures 11, 12:
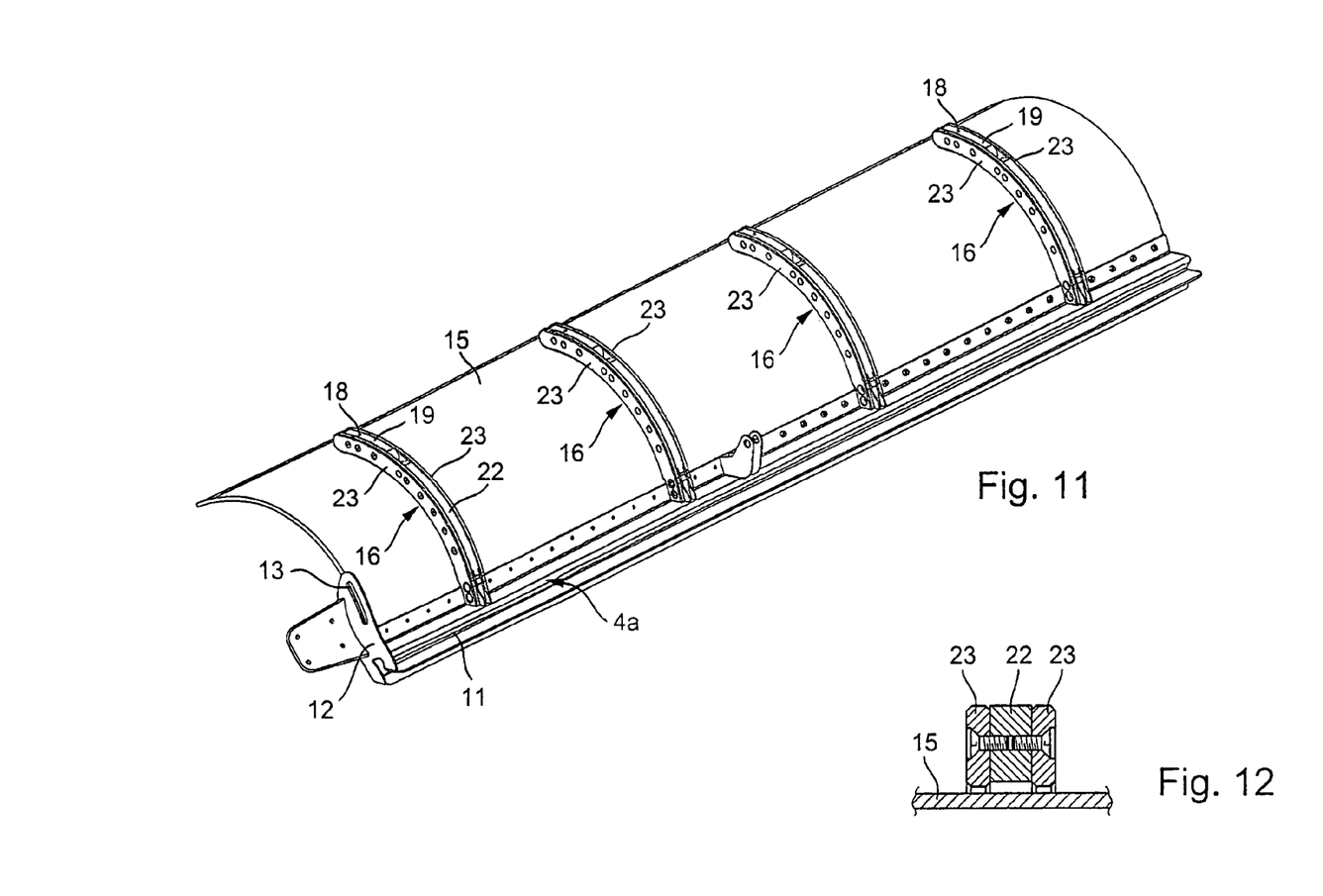
FIG. 11 shows an enlarged perspective representation of the displaceable housing envelope portion with its arcuate wall and a plurality of guide runners.
FIG. 12 shows an enlarged representation of a cross-section through a partial region of the displaceable housing envelope portion according to FIG. 11, at the level of a guide runner.

Additionally mounted on the stationary housing envelope portion 2a is a displaceable housing envelope portion 2'a, which is represented in an upper end position in FIG. 4 and in a lower end position in FIG. 3. In the lower end position, the housing envelope of the tiller housing is extended by approximately 20° in the circumferential direction by this additional, displaceable housing envelope portion 2'a. The extension by the displaceable housing envelope portion 2'a is effected on the back side of the tiller housing, i.e. on the side of the tiller housing that faces towards the smoothing means. The displaceable, and consequently movable, housing envelope portion 2'a has a dimensionally stable carrier profile made of metal, preferably of steel, which extends over an entire working width of the represented housing portion of the tiller housing. The carrier profile 4 has a swallow-tail type profile receiver 11, in which—as already described—a front outside-face edge of the rear finisher is held positively. The carrier profile 4a extends parallelwise in relation to a back-side longitudinal edge of the stationary housing envelope portion 2a and is disposed substantially in an aligned extension in relation to the stationary housing envelope portion 2a. The stationary housing envelope portion 2a has a back-side and a front-side stiffening profile 9a, which likewise extends over the entire working width of the stationary housing envelope portion 2a, as also the carrier profile 4a. The stiffening profiles 9a and the stationary housing envelope portion 2a are made of metal. The carrier profile 4a is held displaceably, in a fan-like manner, on the stationary housing envelope portion 2a by means of a plurality of guide arrangements 8a. The guide arrangements 8a are constituted, on the one hand, by guide profilings 17, which are fastened to the outer circumference of the housing envelope portion 2a and which extend in the manner of rails in the circumferential direction over the housing envelope portion 2a (FIG. 6). These guide profilings 17 constitute guide grooves for guide runners 16, which project forwards and upwards in an arcuate form, parallelwise in relation to one another in the circumferential direction, away from the carrier profile 4a (FIG. 11). The guide runners 16 likewise belong to the guide arrangements 8a and have core portions 19 and 22 made of metal, the lower core portions 22 being fastened to the carrier profile 4a. Each core portion 22, 19 of a guide runner is flanked on both sides by slide runner portions 23 made of a plastic material having a low coefficient of sliding friction. These slide runner portions serve to facilitate the displaceability of the guide runners 16 in the guide profilings 17.

Figure 7:
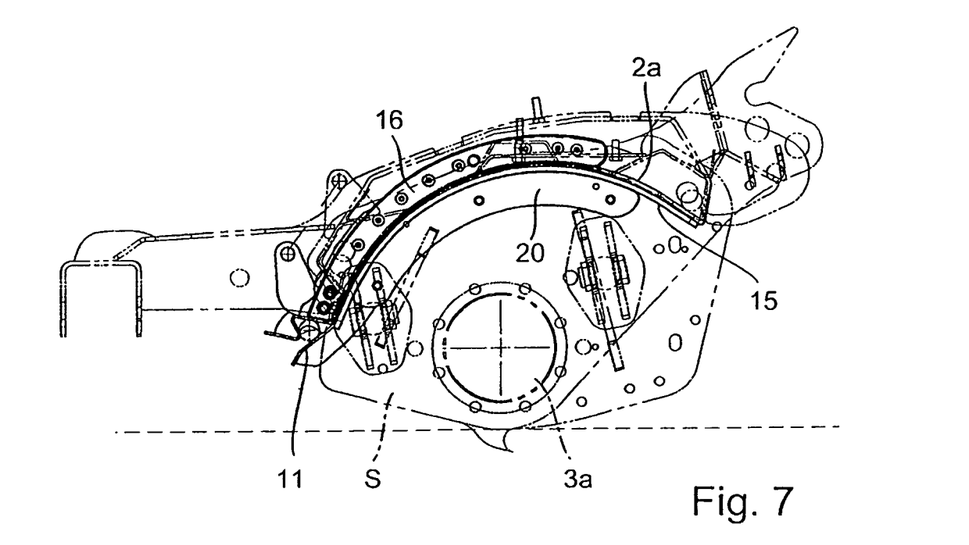
FIG. 7 shows, in schematic form, a longitudinal sectional representation of the rear tiller according to FIGS. 3 to 6, in an upper end position of the displaceable housing envelope portion.
Figure 8:
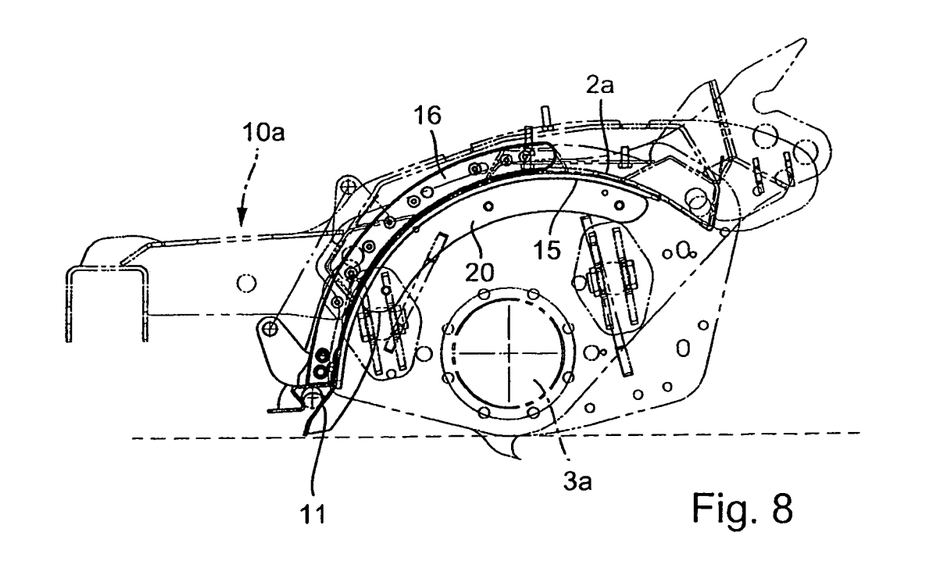
FIG. 8 shows the rear tiller according to FIG. 7, in which the displaceable housing envelope portion is positioned in its lower end position.
Figure 9:
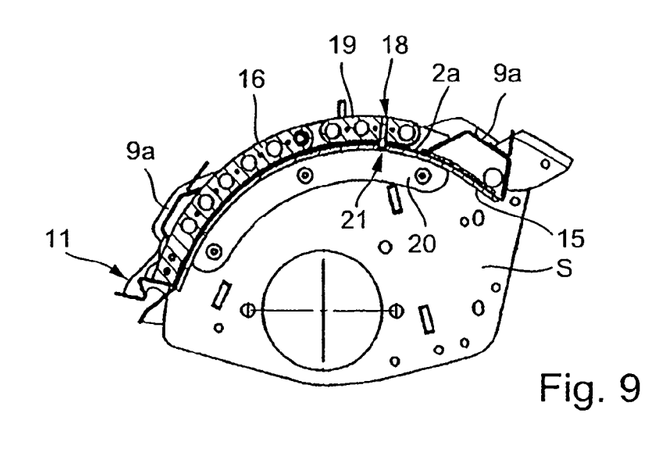
FIG. 9 shows a reduced-size representation of a further section through the rear tiller according to FIGS. 3 to 6, similar to that of FIGS. 7 and 8, but with a plurality of parts of the rear tiller having been omitted.

A wall 15, which is arcuate in cross-section and therefore dish-shaped, and which is disposed with uniform spacing radially within the guide runners 16, projects obliquely upwards and forwards away from the carrier profile 4a. When mounted, the wall 15 fits closely, on the inside, against an inner wall of the stationary housing envelope portion 2a, within the tiller housing (FIGS. 7 to 9). Fastened to the opposing, outside-face housing closures S of the stationary housing envelope portion are arcuate guide webs 20 (FIGS. 7 to 9), which are disposed at a short distance from and parallelwise in relation to the inner wall of the stationary housing envelope portion 2a. The distance of the guide webs 20 from the housing inner wall of the stationary housing envelope portion 2a is selected in such a way that the dish-shaped wall 15 is guided, with its opposing lateral edge regions, in a guide gap defined between the guide webs 20 and the housing inner wall. Reliable guidance of the opposing lateral edges of the wall 15 is thereby achieved. The carrier profile 4a additionally has a lateral cheek 12, which is guided on the outside of the outside-face housing closure S (FIG. 6) of the stationary housing envelope portion by means of an arcuate slotted guide 13. For this purpose, a sliding-block type guide stud 14 is fastened to the outside-face housing closure S.

Figure 10:
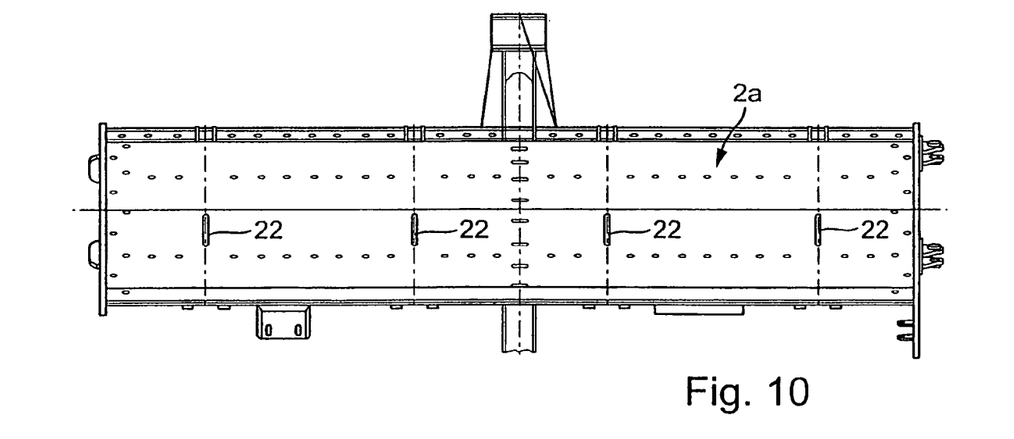
FIG. 10 shows, viewed from below, the stationary housing envelope portion of the tiller housing according to FIGS. 3 to 9.

To enable the wall 15 to fit closely against the inner wall of the stationary housing envelope portion 2a in a reliable manner over the entire working width of the housing portion, a total of four longitudinal slots 22, which go through the housing envelope portion from the inside to the outside, are provided in the impact wall of the housing envelope portion 2a, as can be seen from FIG. 10. Projecting through the longitudinal slots 22 in each case is a screw-type or pin-type securing element 21, which goes through the wall 15 from the inside and which is fastened in a receiving hole 18 of the core element 19. Preferably, the securing element 21 is in the form of a screw provided with a screw head, and the receiving hole 18 is realized as a corresponding threaded hole. This makes it possible for the wall 15, in its surface region that is distant from the carrier profile 4a, to be kept bearing against the inner wall of the stationary housing portion. The length of the longitudinal slot 22 preferably corresponds to the length of the slotted guide 13. The longitudinal slots 22 and the slotted guide 13 thus delimit the displacement path of the movable housing envelope portion 2'a, including its wall 15, its carrier profile 4a and its guide runners 16. At the same time, the securing of the wall 15 at the corresponding guide runners 16 from an inside also ensures that the guide runners cannot lift off from the guide profilings 17 of the stationary housing envelope portion.

The wall 15 is composed of plastic, which preferably can have a noise-damping function. It can be seen from FIGS. 7 and 8 that the wall 15, in an upper end position of the movable housing envelope portion 2'a, overlaps completely an inner wall of the stationary housing envelope portion 2a. In a lower end position (FIG. 8), on the other hand, the wall 15 is shifted downwards in a fan-like manner relative to the inner wall of the stationary housing envelope portion 2a, as a result of which the housing wall that is usable for the tiller shaft is enlarged by the correspondingly displaced angular amount instead of an impact wall over a circumference of, preferably, approximately 110°, an impact wall over a circumference of approximately 130° is thereby produced.

Figure 5:
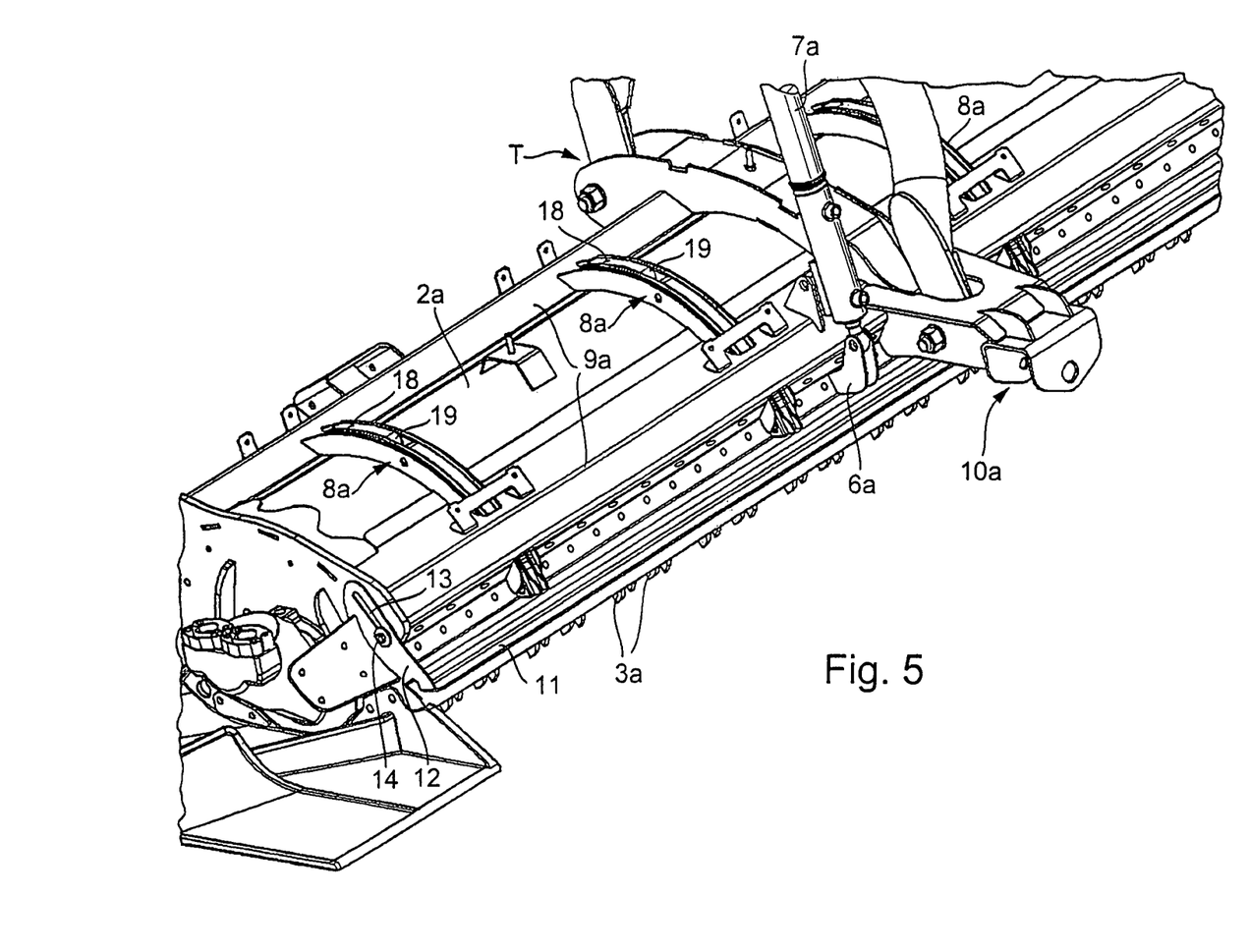
FIG. 5 shows a perspective representation of a part of the rear tiller according to FIGS. 3 and 4.

A shifting of the movable housing envelope portion 2'a, and therefore of the wall 15, is effected by drive means, which, according to the representation according to FIGS. 3 to 5, comprise a hydraulic cylinder 7a. The control is preferably effected from the trail caterpillar. Depending on the working width of the tiller housing, or of a corresponding housing portion, one or more hydraulic cylinders 7a can be disposed in a distributed manner over the working width.

The invention claimed is:

1. A rear tiller for a tracked vehicle for snow-trail preparation and maintenance comprising a driven working shaft arrangement rotatably mounted in a preparation housing that is open towards a ground, wherein the preparation housing has at least two housing envelope portions mounted so as to be movable in a fan-like manner relative to a rotational axis of the driven working shaft arrangement and relative to one another in a circumferential direction, the at least two housing envelope portions comprising at least one stationary housing envelope portion and at least one movable housing envelope portion, the at least one movable housing envelope portion being mounted so as to be displaceable relative to the at least one stationary housing envelope portion and relative to the rotational axis of the working shaft arrangement as viewed in the circumferential direction in such a way that, in a first end position, the at least two housing envelope portions overlap one another in the circumferential direction and, in a second end position, the at least one movable housing envelope portion extends from the at least one stationary housing envelope portion in a substantially aligned manner, and in that the at least one movable housing envelope portion has a wall that is arcuate in cross-section and that overlaps the at least one stationary housing envelope portion on an inside thereof in the circumferential direction, at least to a large extent, and abuts an internal arcuate wall of the at least one stationary housing envelope portion.

2. The rear tiller according to claim 1, wherein the preparation housing is adjoined on a back side thereof, relative to a preparation direction, by a smoothing means which has a flexible smoothing structure that is attached to the at least one movable housing envelope portion or to the at least one stationary housing envelope portion.

3. The rear tiller according to claim 1, further including drive means for adjusting the at least one movable housing envelope portion into differing positions and securing the at least one movable housing envelope portion in respectively set positions.

4. The rear tiller according to claim 1, wherein the wall of the at least one movable housing envelope portion is an impact-resistant, noise-damping and at least largely dimensionally stable surface structure.

5. The rear tiller according to claim 1, wherein the wall of the at least one movable housing envelope portion is held at a carrier profile from which the wall of the at least one movable housing envelope portion projects away freely, and which is displaceably guided on an outside of the at least one stationary housing envelope portion by guide arrangements.

6. The rear tiller according to claim 5, wherein the carrier profile is disposed adjacently to a longitudinal lateral edge of the at least one stationary housing envelope portion.

7. The rear tiller according to claim 5, wherein the guide arrangements have arcuate guide runners which are displaceably guided in guide profilings on an outer circumference of the at least one stationary housing envelope portion.

8. The rear tiller according to claim 7, wherein the guide runners have sliding surface portions having a reduced coefficient of sliding friction.

9. The rear tiller according to claim 7, wherein a surface region of the wall of the at least one movable housing envelope portion that is at a distance from the carrier profile is connected to the guide runners via securing means, the securing means projecting through longitudinal slots in the at least one stationary housing envelope portion.

10. The rear tiller according to claim 1, further including arcuate guide webs, which guide opposing lateral edges of the wall of the at least one movable housing envelope portion, provided at opposing outside-face housing closures of the preparation housing.

11. A rear tiller for a tracked vehicle for snow-trail preparation and maintenance comprising:
- a preparation housing having an opening for facing towards a ground and having a driven working shaft arrangement rotatably mounted therein and at least two housing envelope portions;
- the at least two housing envelope portions being adjacent to each other to form a cover for the driven working shaft arrangement and being mounted so as to be movable in a manner relative to a rotational axis of the driven working shaft arrangement to allow the cover to contract and expand;
- the at least two housing envelope portions being movable relative to one another in a substantially circumferential direction about the rotational axis of the driven working shaft arrangement;
- the at least two housing envelope portions comprising a stationary housing envelope portion and a movable housing envelope portion;
- the movable housing envelope portion being mounted so as to be displaceable relative to the stationary housing envelope portion and relative to the rotational axis of the working shaft arrangement as viewed in the circumferential direction in such a way that, in a first end position, the at least two housing envelope portions overlap one another in the circumferential direction and, in a second end position, the movable housing envelope portion extends from the stationary housing envelope portion in a substantially aligned manner;
- the movable housing envelope portion having an arcuate wall that at least partially overlaps the stationary housing envelope portion on an inside thereof in the circumferential direction; and
- the arcuate wall of the movable housing envelope portion abutting an arcuate internal wall of the stationary housing envelope portion.

12. The rear tiller according to claim 11, wherein a first distance from a front edge of the cover to the rotational axis of the working shaft arrangement is greater than a second distance from a rear edge of the cover to the rotational axis of the working shaft arrangement.

* * * * *